United States Patent
Akaishi et al.

(10) Patent No.: US 11,059,968 B2
(45) Date of Patent: Jul. 13, 2021

(54) POLYESTER ELASTOMER RESIN COMPOSITION HAVING IMPROVED MOLD FOULING

(71) Applicant: TOYOBO CO., LTD., Osaka (JP)

(72) Inventors: Takuya Akaishi, Shiga (JP); Yuki Maeda, Shiga (JP); Eri Morio, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 127 days.

(21) Appl. No.: 16/468,404

(22) PCT Filed: Feb. 26, 2018

(86) PCT No.: PCT/JP2018/006914
§ 371 (c)(1),
(2) Date: Jun. 11, 2019

(87) PCT Pub. No.: WO2018/159521
PCT Pub. Date: Sep. 7, 2018

(65) Prior Publication Data
US 2019/0300699 A1 Oct. 3, 2019

(30) Foreign Application Priority Data
Feb. 28, 2017 (JP) .............................. JP2017-035850

(51) Int. Cl.
| | | |
|---|---|---|
| *C08L 67/02* | (2006.01) | |
| *C08K 5/00* | (2006.01) | |
| *C08K 5/13* | (2006.01) | |
| *C08K 5/21* | (2006.01) | |
| *C08K 5/29* | (2006.01) | |
| *C08K 5/49* | (2006.01) | |
| *C08L 77/00* | (2006.01) | |
| *C08L 79/00* | (2006.01) | |
| *C08L 67/00* | (2006.01) | |

(52) U.S. Cl.
CPC .............. *C08L 67/02* (2013.01); *C08K 5/005* (2013.01); *C08K 5/13* (2013.01); *C08K 5/21* (2013.01); *C08K 5/29* (2013.01); *C08K 5/49* (2013.01); *C08L 67/00* (2013.01); *C08L 77/00* (2013.01); *C08L 79/00* (2013.01); *C08L 2205/03* (2013.01); *C08L 2207/04* (2013.01)

(58) Field of Classification Search
CPC .. C08L 67/02; C08L 2207/04; C08L 2205/03; C08K 5/21; C08K 5/29

USPC .......................................................... 524/513
See application file for complete search history.

(56) References Cited

U.S. PATENT DOCUMENTS

| | | | |
|---|---|---|---|
| 5,856,104 A | 1/1999 | Imashiro et al. | |
| 2017/0130046 A1* | 5/2017 | Ohashi | .................. C08L 67/025 |

FOREIGN PATENT DOCUMENTS

| | | | |
|---|---|---|---|
| EP | 3 415 564 A1 | * | 12/2018 |
| JP | 9-235508 | | 9/1997 |
| JP | 11-323109 | | 11/1999 |
| JP | 11-323110 | | 11/1999 |
| JP | 3714747 | | 11/2005 |
| JP | 2009-263648 | | 11/2009 |
| JP | 2012-107155 | | 6/2012 |
| WO | 2014/050961 | | 4/2014 |
| WO | WO 2015/194583 | * | 12/2015 |
| WO | 2017/138548 | | 8/2017 |

OTHER PUBLICATIONS

International Preliminary Report on Patentability dated Sep. 12, 2019 in International Application No. PCT/JP2018/006914.
International Search Report dated May 1, 2018 in International Application No. PCT/JP2018/006914.
Extended European Search Report dated Oct. 2, 2020, in corresponding European Patent Application No. 18760672.8.

* cited by examiner

*Primary Examiner* — Doris L Lee
(74) *Attorney, Agent, or Firm* — Wenderoth, Lind & Ponack, L.L.P.

(57) ABSTRACT

A polyester elastomer resin composition that provides improved mold fouling in a continuous use for a long-term, and prevents the lowering in physical properties of polyester elatomer which causes by contacting with grease in environments exceeding 140° C. The polyester elastomer resin composition contains a thermoplastic polyester elastomer (A) prepared by bonding a hard segment and a soft segment an alicyclic polycarbodiimide compound and/or an aliphatic polycarbodiimide compound (B); and a polyamide resin (C) having an amine value of 50 to 2000 eq/t in such a ratio that (B) is in 0.1 to 5 part(s) by mass and (C) is in 0.1 to 10 part(s) by mass to 100 parts by mass of (A). The polyester elastomer resin composition has an acid value which is more than 5 eq/t and not more than 20 eq/t.

6 Claims, No Drawings

US 11,059,968 B2

POLYESTER ELASTOMER RESIN COMPOSITION HAVING IMPROVED MOLD FOULING

TECHNICAL FIELD OF THE INVENTION

The present invention relates to a polyester elastomer resin composition which exhibits not only excellent grease resistance but also improved mold fouling.

BACKGROUND ART

A thermoplastic polyester elastomer exhibits excellent injection molding ability and excellent extrusion molding ability, high mechanical strength, excellent rubber properties such as elasticity recovery, shock resistance and flexibility, as well as excellent cold resistance. Therefore, the thermoplastic polyester elastomer has been used in fields such as automobile parts, electric/electronic parts, fiber and film.

Up to now, the thermoplastic polyester elastomer has not been suitable for blow molding due to its low melt viscosity. However, a thickening method by using a polyepoxy compound or a polyisocyanate compound has become to be adopted. In recent years, the thermoplastic polyester elastomer has been adopted, utilizing its characteristic features, in blow-molded products such as flexible boots for dust-proofing and grease retention of universal axial joints (such as uniform-velocity joints of automobiles) (Patent Document 1).

Examples of characteristic properties demanded for functional parts such as flexible boots are flexural fatigue resistance, thermal aging resistance, oil resistance and grease resistance. As to these characteristic properties, higher level has been demanded year by year. As to measures therefor, a combination of antioxidants (Patent Document 2), a combination of an antioxidant with an epoxy compound (Patent Document 3), a combination of an epoxy compound with a carbodiimide compound (Patent Document 4), etc. have been proposed.

In the methods of Patent Documents 2 and 3, improvement effects have been surely noted in terms of thermal aging resistance, oil resistance, grease resistance etc. However, particularly with regard to the grease resistance, there are some cases wherein the effect is not sufficient in terms of flexural fatigue resistance under severer environments exceeding 140° C. Accordingly, there is yet room for improvement. In the method of Patent Document 4, it is necessary to compound with a large amount of the epoxy compound. In addition, no consideration has been done at all for the characteristic property such as oil resistance and grease resistance of blow-molded products.

In order to solve the problems as such in the prior art, the Applicant proposed a polyester elastomer resin composition which is also excellent in grease resistance under high-temperature environments (Patent Document 5). The grease resistance is well taken into consideration in the method of Patent Document 5. However, a problem of mold fouling occurs upon a continuous molding for a long term. Accordingly, there is yet room for further improvement.

PRIOR ART DOCUMENTS

Patent Documents

Patent Document 1: Japanese Patent No. 3714747
Patent Document 2: Japanese Patent Application Laid-Open (JP-A) No. 323109/99
Patent Document 3: Japanese Patent Application Laid-Open (JP-A) No. 323110/99
Patent Document 4: Japanese Patent Application Laid-Open (JP-A) No. 2012-107155
Patent Document 5: PCT/JP2017/004502

DISCLOSURE OF THE INVENTION

Problem that the Invention is to Solve

The present invention has been achieved in view of the above-mentioned current status in the prior art. An object of the present invention is to provide a polyester elastomer resin composition which exhibits not only excellent grease resistance under high-temperature environments but also improved mold fouling.

Means for Solving the Problem

In order to achieve the above object, the inventors have conducted intensive investigations for an improvement of the grease resistance and for a cause of the mold fouling generated upon continuous molding for a long term. As a result, they have found that, when an alicyclic polycarbodiimide compound and/or an aliphatic polycarbodiimide compound are/is compounded as thickener(s), the improvement in the grease resistance is noted but an isocyanate compound (which is a decomposed product of the polycarbodiimide compound) is generated upon the continuous molding for a long term whereupon the mold fouling is significantly worsened. Then, as an index for an amount of the polycarbodiimide compound, they paid their attention to an acid value of the polyester elastomer resin composition. They found that, when the acid value was limited to a specific range, the generation of the isocyanate compound could be effectively suppressed whereupon the present invention has been accomplished.

Thus, the present invention has the constitution comprising the following (1) to (6).

(1) A polyester elastomer resin composition which contains;

a thermoplastic polyester elastomer (A) prepared by bonding a hard segment and a soft segment, wherein the hard segment comprises a polyester constituted from an aromatic dicarboxylic acid and an aliphatic and/or alicyclic diol(s) as constituting ingredients, and wherein the soft segment is at least one member selected from a group consisting of an aliphatic polyether, an aliphatic polyester and an aliphatic polycarbonate;

an alicyclic polycarbodiimide compound and/or an aliphatic polycarbodiimide compound (B); and a polyamide resin (C) having an amine value of 50 to 2000 eq/t in such a ratio that (B) is in 0.1 to 5 part(s) by mass and (C) is in 0.1 to 10 part(s) by mass to 100 parts by mass of (A), characterized in that the polyester elastomer resin composition has an acid value which is more than 5 eq/t and not more than 20 eq/t.

(2) The polyester elastomer resin composition according to (1), wherein the polycarbodiimide compound (B) is compounded in such a ratio that an amount of a carbodiimide functional group thereof is 0.3 to 1.5 equivalent (s) when an amount of a terminal carboxyl group in the thermoplastic polyester elastomer (A) is taken as 1.

(3) The polyester elastomer resin composition according to (1) or (2), wherein the polyester elastomer resin composition further contains at least one kind of antioxidant selected from a group consisting of an antioxidant of an aromatic amine type, an antioxidant of a hindered phenol type, an antioxidant of a sulfur type and an antioxidant of a phosphorus type, and wherein an amount of the above antioxidant is in a ratio of 0.01 to 3 part (s) by mass to 100 parts by mass of the thermoplastic polyester elastomer (A).

(4) The polyester elastomer resin composition according to any of (1)-(3), wherein a reduced viscosity of the polyester elastomer resin composition is from 2.0 to 3.5 dl/g.

(5) The polyester elastomer resin composition according to any of (1)-(4), wherein a tensile elongation is 200% or more, and wherein the tensile elongation is measured on the polyester elastomer resin composition which has been subjected to a thermal treatment at 140° C. for 300 hours in a state in which a urea compound-containing grease is applied to the polyester elastomer resin composition.

(6) The polyester elastomer resin composition according to any of (1)-(5), wherein the soft segment of the thermoplastic polyester elastomer resin (A) is an aliphatic polyether.

Effects of the Invention

The polyester elastomer resin composition of the present invention exhibits not only excellent grease resistance under high-temperature environments but also little mold fouling upon its continued use for a long term, and thus it exhibits excellent productivity. Therefore, the polyester elastomer resin composition of the present invention can be advantageously used even under severe environments exceeding 140° C. in such a field wherein high levels of flexural fatigue resistance, thermal aging resistance, oil resistance, grease resistance, etc. are demanded.

MODE FOR CARRYING OUT THE INVENTION

The polyester elastomer resin composition of the present invention is a polyester elastomer resin composition which contains; a thermoplastic polyester elastomer (A) prepared by bonding a hard segment and a soft segment, wherein the hard segment comprises a polyester constituted from an aromatic dicarboxylic acid and an aliphatic and/or alicyclic diol(s) as constituting ingredients, and wherein the soft segment is at least one member selected from a group consisting of an aliphatic polyether, an aliphatic polyester and an aliphatic polycarbonate; an alicyclic polycarbodiimide compound and/or an aliphatic polycarbodiimide compound (B); and a polyamide resin (C) having an amine value of 50 to 2000 eq/t in a specific ratio, characterized in that the polyester elastomer resin composition has an acid value which is more than 5 eq/t and not more than 20 eq/t.

[Thermoplastic Polyester Elastomer (A)]

The thermoplastic polyester elastomer (A) used in the present invention consists of a hard segment and a soft segment. The hard segment comprises polyester. As to an aromatic dicarboxylic acid constituting the polyester of the hard segment, common aromatic dicarboxylic acid can be widely used and there is no particular limitation therefor. As to a main aromatic dicarboxylic acid, it is desirable to use terephthalic acid or naphthalenedicarboxylic acid (to be more specific, among isomers thereof, 2,6-naphthalenedicarboxylic acid is preferred). Content of the aromatic dicarboxylic acid as such is preferred to be 70 molar % or more, and more preferred to be 80 molar % or more, in the total dicarboxylic acids constituting the polyester of the hard segment. As to other dicarboxylic acid ingredients, there are exemplified an aromatic dicarboxylic acid (such as diphenyl dicarboxylic acid, isophthalic acid and 5-sodium sulfoisophthalate), an alicyclic dicarboxylic acid (such as cyclohexanedicarboxylic acid and tetrahydrophthalic anhydride) and an aliphatic dicarboxylic acid (such as succinic acid, glutaric acid, adipic acid, azelaic acid, sebacic acid, dodecan-dioic acid, dimer acid and hydrogenated dimer acid). They can be used within such an extent that they do not greatly lower a melting point of the resin. Content thereof is 30 molar % or less, preferably 20 molar % or less of the whole acid ingredients.

Further, as to an aliphatic or alicyclic diol constituting the polyester of the hard segment in the thermoplastic polyester elastomer (A) used in the present invention, common aliphatic or alicyclic diol can be widely used and there is no particular limitation therefor. Mostly, it is preferred to be an alkylene glycol having 2 to 8 carbons. To be more specific, there are exemplified ethylene glycol, 1,3-propylene glycol, 1,4-butanediol, 1,6-hexanediol and 1,4-cyclohexane-dimethanol. Among them, any of ethylene glycol and 1,4-butanediol is preferred in view of imparting a heat resistance.

As to the ingredient constituting the polyester of the above hard segment, that which consists of a butylene terephthalate unit (a unit consisting of terephthalic acid and 1,4-butanediol) or that which consists of a butylene naphthalate unit (a unit consisting of 2,6-naphthalenedicarboxylic acid and 1,4-butanediol) is preferred in view of physical property, molding ability and cost performance.

Furthermore, when the aromatic polyester which is advantageous as the polyester constituting the hard segment in the thermoplastic polyester elastomer (A) used in the present invention is previously produced and is then copolymerized with an ingredient of the soft segment, the aromatic polyester as such can be easily produced in accordance with a common method for producing a polyester. Still further, the polyester as such is preferred to have a number-average molecular weight of from 10000 to 40000.

The soft segment of the thermoplastic polyester elastomer (A) used in the present invention is at least one member selected from a group consisting of aliphatic polyether, aliphatic polyester and aliphatic polycarbonate.

As to the aliphatic polyether, there are exemplified poly (ethylene oxide) glycol, poly(propylene oxide) glycol, poly (tetramethylene oxide) glycol, poly(hexamethylene oxide) glycol, poly(trimethylene oxide) glycol, a copolymer of ethylene oxide with propylene oxide, an adduct of poly (propylene oxide) glycol with ethylene oxide and a copolymer of ethylene oxide with tetrahydrofuran. Among them, poly(tetramethylene oxide) glycol and the adduct of poly (propylene oxide) glycol with ethylene oxide are preferred in view of elastic property.

As to the aliphatic polyester, there are exemplified poly (ε-caprolactone), polyenantho-lactone, polycaprylo-lactone and poly(butylene adipate). Among them, poly(ε-caprolactone) and poly(butylene adipate) are preferred in view of the elastic property.

The aliphatic polycarbonate is preferred to mainly consist of an aliphatic diol group having 2 to 12 carbons. As to the aliphatic diol as such, there are exemplified ethylene glycol, 1,3-propylene glycol, 1,4-butanediol, 1,5-pentanediol, 1,6-hexanediol, 1,8-octanediol, 2,2-dimethyl-1,3-propane-diol, 3-methyl-1,5-pentanediol, 2,4-diethyl-1,5-pentanediol, 1,9-nonanediol and 2-methyl-1,8-octanediol. An aliphatic diol having 5 to 12 carbons is preferred particularly in view of flexibility and low-temperature characteristics of the resulting thermoplastic polyester elastomer. Those ingredients may be used either solely or jointly by combining two or more thereof if necessary depending upon the cases mentioned below.

As to the aliphatic polycarbonate-diol constituting the soft segment of the thermoplastic polyester elastomer (A) used in the present invention having good low-temperature characteristics, that having a low melting point (such as 70° C. or lower) and a low glass transition temperature is preferred. An aliphatic polycarbonate-diol consisting of 1,6-hexanediol which is usually used in forming a soft segment of a thermoplastic polyester elastomer has a glass transition temperature of as low as about −60° C. and has a melting point of as low as about 50° C. Therefore, its low-temperature characteristics are good. Besides the above, an aliphatic polycarbonate-diol prepared by copolymerization of the above aliphatic polycarbonate-diol with an appropriate amount of 3-methyl-1,5-pentanediol for example has somewhat higher glass transition point as compared with the starting aliphatic polycarbonate-diol but its melting point lowers or it becomes amorphous whereby it corresponds to an aliphatic polycarbonate-diol having good low-temperature characteristics. Moreover, in an aliphatic polycarbonate-diol consisting of, for example, 1,9-nonanediol and 2-methyl-1,8-octanediol, its melting point and glass transition temperature are as sufficiently low as about 30° C. and about −70° C., respectively whereby it corresponds to an aliphatic polycarbonate-diol having good low-temperature characteristics.

As to the soft segment of the thermoplastic polyester elastomer (A) used in the present invention, an aliphatic polyether is preferred in view of solving the problems of the present invention.

As to the thermoplastic polyester elastomer (A) used in the present invention, it is preferred to be a copolymer constituted from terephthalic acid, 1,4-butanediol and poly (tetramethylene oxide) glycol as main ingredients. It is preferred that, in the dicarboxylic acid ingredients constituting the thermoplastic polyester elastomer (A), terephthalic acid is 40 molar % or more, more preferred to be 70 molar % or more, further preferred to be 80 molar % or more, and especially preferred to be 90 molar % or more. It is preferred that, in the glycol ingredients constituting the thermoplastic polyester elastomer (A), a total amount of 1,4-butanediol and poly(tetramethylene oxide) glycol is 40 molar % or more, more preferred to be 70 molar % or more, further preferred to be 80 molar % or more, and especially preferred to be 90 molar % or more.

A number-average molecular weight of the above poly (tetramethylene oxide) glycol is preferred to be from 500 to 4000. When the number-average molecular weight is less than 500, elastomer characteristic property may be hardly achieved. On the other hand, when the number-average molecular weight is more than 4000, compatibility with the hard segment may lower whereby it may become difficult to be copolymerized into a block form. The number-average molecular weight of the above poly(tetramethylene oxide) glycol is more preferred to be from 800 to 3000, and further preferred to be from 1000 to 2500.

In the thermoplastic polyester elastomer (A) used in the present invention, it is generally preferred that a ratio by mass of the hard segment to the soft segment in terms of (hard segment):(soft segment) is from 30:70 to 95:5. More preferably, the ratio is from 40:60 to 90:10. Further preferably, the ratio is from 45:55 to 87:13. Most preferably the ratio is from 50:50 to 85:15.

The thermoplastic polyester elastomer (A) used in the present invention can be produced by known methods. For examples, there are a method wherein a lower alcohol diester of dicarboxylic acid is subjected to a transesterification with an excessive amount of low-molecular glycol and a soft segment ingredient in the presence of a catalyst and the resulting reaction product is subjected to a polycondensation; a method wherein a dicarboxylic acid is subjected to a transesterification with an excessive amount of glycol and a soft segment ingredient in the presence of a catalyst and the resulting reaction product is subjected to a polycondensation; a method wherein polyester of a hard segment is previously produced and a soft segment ingredient is added thereto followed by randomizing by means of a transesterification; a method wherein a hard segment and a soft segment are connected using a chain linking agent; and, when poly(ε-caprolactone) is used as a soft segment, a method wherein an ε-caprolactone monomer is subjected to an addition reaction to a hard segment. Any of those methods may be used.

[Alicyclic Polycarbodiimide Compound and/or Aliphatic Polycarbodiimide Compound (B)]

An alicyclic polycarbodiimide compound and/or an aliphatic polycarbodiimide compound (B) used in the present invention play(s) a role of a thickener. The alicyclic polycarbodiimide compound and/or an aliphatic polycarbodiimide compound (B) used in the present invention consist(s) of alicyclic and/or aliphatic compound(s). There is no particular limitation therefor so far as it/they is/are polycarbodiimide(s) having two or more carbodiimide groups (a structure of —N=C=N—) in a molecule.

The alicyclic polycarbodiimide compound and/or the aliphatic polycarbodiimide compound (B) used in the present invention can be prepared by, for example, removing carbon dioxide from a diisocyanate compound. As to the diisocyanate compound which can be used here, there are exemplified hexamethylene diisocyanate, dicyclohexyl-methane diisocyanate, cyclohexane-1,4-diisocyanate, xylylene diisocyanate, isophorone diisocyanate, methylcyclohexane disocyanate, tetramethylxylylene diisocyanate, 1,3,5-tri-isopropylphenylene 2,4-diisocyanate. Only one of them may be used or two or more of them may be copolymerized and used. It is also possible that a branched structure is introduced or a functional group other than carbodiimide group or isocyanate group is introduced by means of copolymerization. Further, although terminal isocyanate may be used as it is, a degree of polymerization may also be controlled by reacting the terminal isocyanate. A part of the terminal isocyanate may also be blocked.

As to the alicyclic polycarbodiimide compound and/or the aliphatic polycarbodiimide compound (B) used in the present invention, an alicyclic polycarbodiimide derived from dicyclohexylmethane diisocyanate, cyclohexane-1,4-diisocyanate, isophorone diisocyanate, etc. is particularly preferred. A polycarbodiimide derived from dicyclohexylmethane diisocyanate or isophorone diisocyanate is particularly preferred.

As to the alicyclic polycarbodiimide compound and/or the aliphatic polycarbodiimide compound (B) used in the present invention, it is preferable that they/it contain(s) 2 to 50 carbodiimide groups per molecule, in view of stability and handling property. It is more preferable that they/it contain (s) 5 to 30 carbodiimide groups per molecule. A number of carbodiimide (or, in other words, a number of carbodiimide group) in a polycarbodiimide molecule corresponds to a degree of polymerization in the case of a polycarbodiimide prepared from a diisocyanate compound. For example, the degree of polymerization of a polycarbodiimide prepared by connection of 21 diisocyanate compounds in a chain form is 20, and a number of carbodiimide in a molecular chain is 20. Usually, a polycarbodiimide compound is a mixture of molecules having various lengths, and thus a number of the carbodiimide group is expressed by a mean value. When a polycarbodiimide compound has a carbodiimide group number within the above range and is solid at about a room temperature, it can be made into powder whereby it is excellent in terms of workability and compatibility upon mixing with the thermoplastic polyester elastomer (A) and is preferred in view of uniform reactivity and resistance to bleeding out as well. Incidentally, a number of carbodiimide group can be measured, for example, by a common method (a method wherein a back titration is conducted with hydrochloric acid after dissolving with an amine).

In view of safety and handling property, it is preferred that the alicyclic polycarbodiimide compound and/or the aliphatic polycarbodiimide compound (B) used in the present invention have/has an isocyanate group in a terminal thereof and a content of the isocyanate group is from 0.5 to 4% by mass. More preferably, the content of the isocyanate group is from to 3% by mass. Particularly preferred one is a polycarbodiimide derived from dicyclohexylmethane diisocyanate or isophorone diisocyanate and having the content of the isocyanate group within the above-mentioned range. Incidentally, the content of the isocyanate group can be measured by a common method (a method wherein a back titration is conducted with hydrochloric acid after dissolving with an amine).

A content of the alicyclic polycarbodiimide compound and/or the aliphatic polycarbodiimide compound (B) used in the present invention to 100 parts by mass of the thermoplastic polyester elastomer (A) is from 0.1 to 5 part(s) by mass, preferably from 0.3 to 3 part(s) by mass, and more preferably from 0.5 to 1.5 part(s) by mass. When the content of the alicyclic polycarbodiimide compound and/or the aliphatic polycarbodiimide compound (B) used in the present invention is less than the above range, an aimed sequestering effect for a terminal carboxyl group of the thermoplastic polyester elastomer (A) may be insufficient while, when it is more than the above range, there is a tendency that the thermoplastic polyester elastomer (A) is hydrolyzed due to a basicity of the polycarbodiimide compound whereby the mechanical property is affected.

Preferably, a compounding ratio of the alicyclic polycarbodiimide compound and/or the aliphatic polycarbodiimide compound (B) used in the present invention is in such a ratio that an amount of a carbodiimide functional group thereof is 0.3 to 1.5 equivalent(s) when an amount of a terminal carboxyl group in the thermoplastic polyester elastomer (A) is taken as 1. More preferably, the amount of the carbodiimide functional group is from 0.5 to 1.3 equivalent(s). Further preferably, it is from 0.8 to 1.1 equivalent(s). When the amount of the carbodiimide functional group is less than the above range, the aimed sequestering effect for the terminal carboxyl group of the thermoplastic polyester elastomer (A) may be insufficient while, when it is more than the above range, an excessive amount of polycarbodiimide may be decomposed upon molding whereby an isocyanate compound (which is to become a mold-fouling ingredient) may be abundantly generated. Accordingly, an effect for trapping the isocyanate compound due to the polyamide resin (C) being mentioned later may become insufficient and the mold fouling may be significantly increased.

[Polyamide Resin (C)]

The polyamide resin (C) used in the present invention has a role of a trapping agent for urea compounds. The polyamide resin (C) used in the present invention is a polymer compound having an amide bond in a molecular chain. Examples thereof are a polyamide prepared from a diamine having an aliphatic hydrocarbon group of 2 to 20 carbons (or a substituted aliphatic hydrocarbon group thereof) or a diamine having an aromatic hydrocarbon group of 6 to 16 carbons (or a substituted aromatic hydrocarbon group thereof) and a dicarboxylic acid having an aliphatic hydrocarbon group of 2 to 20 carbons (or a substituted aliphatic hydrocarbon group thereof) or an aromatic hydrocarbon group of 6 to 16 carbons (or a substituted aromatic hydrocarbon group thereof); a polymer prepared from lactam; and a polymer prepared from ω-aminocarboxylic acid. For example, a polymer of a salt prepared by a reaction of adipic acid, sebacic acid, linoleic acid, dodecane-dioic acid or the like with ethylenediamine, hexamethylenediamine, m-xylenedaimine or the like is listed. The copolymer as such or two or more kinds thereof in combination may be used. To be more specific, there are exemplified Nylon 4, Nylon 6, Nylon 7, Nylon 8, Nylon 9, Nylon 11 and Nylon 12 prepared from lactam or co-aminocarboxylic acid; Nylon 66, Nylon 69, Nylon 610, Nylon 611, Nylon 612, Nylon 6T, Nylon 61 and Nylon MXD6 prepared from diamine and a dicarboxylic acid; and a copolymer such as Nylon 6/66, Nylon 6/610, Nylon 6/6T and Nylon 61/61.

A content of the polyamide resin (C) used in the present invention to 100 parts by mass of the thermoplastic polyester elastomer (A) is from 0.1 to 10 part (s) by mass. When the polyamide resin (C) is more than the above range, characteristic properties inherent to the thermoplastic polyester elastomer (A) may be deteriorated while, when it is less than the above range, the effect for trapping the isocyanate compound (which is a decomposed product of polycarbodiimide and which is to become a mold-fouling ingredient) may not be achieved. The content of the polyamide resin (C) to 100 parts by mass of the thermoplastic polyester elastomer (A) is preferred to be from 1 to 7 part (s) by mass, and more preferred to be from 2 to 5 part (s) by mass.

It is necessary that an amine value of the polyamide resin (C) used in the present invention is from 50 to 2000 eq/t. When the amine value is less than 50 eq/t, the effect for trapping the isocyanate compound (which is a decomposed product of polycarbodiimide and which is to become a mold-fouling ingredient) is weak. When the amine value is more than 2000 eq/t, the thermoplastic polyester elastomer (A) is hydrolyzed whereby the mechanical property is affected. The amine value is preferred to be from 70 to 1000 eq/t, more preferred to be from 100 to 700 eq/t, and further preferred to be from 100 to 550 eq/t.

It is necessary that an acid value of the polyester elastomer resin composition in the present invention is more than 5 eq/t and not more than 20 eq/t. When the acid value is more than 20 eq/t, there is a tendency that hydrolysis happens by an action of urea compound in the grease under the high-temperature environments of 140° C. or higher whereby the mechanical property is significantly lowered. When the acid value is 5 eq/t or less, polycarbodiimide is excessively contained. Accordingly, the polycarbodiimide in the excessive amount is decomposed upon molding and an isocyanate compound (which is to become a mold-fouling ingredient) is abundantly generated whereupon the effect for trapping the isocyanate compound by a polyamide resin (C) becomes insufficient. As a result, the metal fouling may be significantly increased. The acid value is preferred to be from 5.5 eq/t to 19.5 eq/t, and more preferred to be from 6 eq/t to 19.0 eq/t.

A reduced viscosity of the polyester elastomer resin composition in the present invention is preferred to be from 2.0 to 3.5 dl/g. More preferably, it is from 2.1 to 3.0 dl/g and, still more preferably, it is from 2.2 to 2.9 dl/g. When the reduced viscosity is less than the above range, thermal aging resistance as a resin composition may be insufficient whereby there is a tendency that the aimed grease resistance is not achieved. When the reduced viscosity is more than the above range, there is a tendency that molding processability is apt to be inferior, and thus a poor appearance of a molded product such as a flow mark upon injection molding is apt to be resulted.

In order to make the acid value and the reduced viscosity of the polyester elastomer resin composition into the above ranges, a method using the above-mentioned thickener is simple and convenient although the present invention is not limited thereto. Thus, for example, a solid phase polymerization may be also adopted. As to the solid phase polymerization, known methods may be adopted. For example, a polycondensation is proceeded while allowing pellets to stand or to flow in an inert gas or in vacuo at a temperature being lower to an extent of 20 to 40° C. than a melting point of the thermoplastic polyester elastomer whereupon the viscosity can be increased.

It is preferred that the resin composition of the present invention is compounded with commonly used antioxidants such as those of an aromatic amine type, a hindered phenol type, a phosphorus type and a sulfur type. Two or more kinds thereof may be used jointly. Specific examples of the antioxidant of an aromatic amine type used for the resin composition of the present invention are phenyl naphthylamine, 4,4'-dimethoxy-diphenylamine, 4,4'-bis (α,α-dimethylbenzyl) diphenylamine and 4-isopropoxy diphenylamine.

As to the antioxidant of a hindered phenol type, commonly used compounds can be used. Those having a molecular weight of 500 or more such as N,N'-hexamethylene-bis(3,5-di-tert-butyl-4-hydroxyhydrocinnamic acid amide) and tetrakis[methylene-3-(3,5-di-tert-butyl-4-hydroxyphenyl) propionate]methane are preferred since they are hardly evaporated under high-temperature environments.

As to the antioxidant of a phosphorus type, there are exemplified phosphorus-containing compounds such as phosphoric acid, phosphorous acid, phosphinic acid derivative, phenylphosphonic acid, polyphosphonate and diphosphite-type compound. Specific examples thereof are triphenyl phosphite, diphenyldecyl phosphite, phenyl diisodecyl phosphite, tri(nonylphenyl) phosphite, bis(2,4-di-tert-butylphenyl) pentaerythritol diphosphite and bis(2,6-di-tert-butyl-4-methylphenyl) pentaerythritol diphosphite.

As to the antioxidant of a sulfur type, there are exemplified sulfur-containing compounds such as those of a thioether type, a dithionate type, a mercaptobenzimidazole type, a thiocarbanilide type and a thiodipropionate type. Specific examples thereof are dilauryl thiodipropionate, distearyl thiodipropionate, didodecyl thiodipropionate, ditetradecyl thiodipropionate, dioctadecyl thiodipropionate, pentaerythritol tetrakis(3-dodecyl thiopropionate), thiobis(N-phenyl-(3-naphthylamine), 2-methylmercapto-benzothiazole, 2-mercaptobenzoimidazole, tetramethylthiuram monosulfide, tetramethylthiuram disulfide, nickel dibutyldithiocarbamate, nickel isopropylxanthate and trilauryl trithiophosphite. Particularly, the antioxidants of a thioether type having a thioether structure receives oxygen from an oxidized substance so as to reduce the substance whereby they can be used advantageously.

As to a compounding amount of the above antioxidants, it is preferred to be from 0.01 to 3 part(s) by mass to 100 parts by mass of the thermoplastic polyester elastomer (A), more preferred to be from 0.05 to 2 part(s) by mass, and further preferred to be from 0.1 to 1 part(s) by mass for any of the antioxidants.

A composition and a composing ratio of the polyester elastomer resin composition used in the present invention can be calculated from a protonic integral ratio, which is obtained by dissolving a sample in a solvent such as heavy chloroform and measuring $^1$H-NMR.

Further, when the resin composition of the present invention is required to exhibit a weather resistance, it is preferred to add an ultraviolet absorber and/or a hindered amine-type compound thereto. For example, it is possible to use a light stabilizer such as that of a benzophenone type, a benzotriazole type, a triazole type, a nickel type and a salicylic type. An adding amount thereof is preferred to be from 0.1% to 5% on the basis of a mass of the resin composition.

Various other additives may be added to the polyester elastomer resin composition of the present invention. As to the additives, it is possible to add a resin other than those mentioned above, an inorganic filler, a stabilizer and an anti-aging agent within such an extent that they do not deteriorate the characteristic feature of the present invention. It is also possible to add other additives such as coloring pigment, filler of inorganic and organic types, coupling agent, enhancing agent for tacking property, quencher, stabilizer such as inactivating agent for metal, flame retardant, etc. A total compounding amount of these various antioxidants is preferred to be 20 part (s) by mass or less, and more preferred to be 10 part (s) by mass or less to 100 parts by mass of the thermoplastic polyester elastomer (A).

In the polyester elastomer resin composition of the present invention, a total amount of the thermoplastic polyester elastomer (A), the alicyclic polycarbodiimide compound and/or the aliphatic polycarbodiimide compound (B) and the polyamide resin (C) occupies 70% by mass or more, more preferred to be 80% by mass or more, and further preferred to be 90% by mass or more of the whole composition.

Since the polyester elastomer resin composition of the present invention is constituted as mentioned above, it has such a characteristic feature that, in a thermal aging test for evaluating the grease resistance mentioned in the item of Examples described later, a tensile elongation after a thermal treatment at 140° C. for 300 hours is 200% or more. This tensile elongation is an elongation at break measured in accordance with JIS K6251:2010 as mentioned in the item of Examples.

Moreover, since the polyester elastomer resin composition of the present invention is constituted as mentioned above, it has such a characteristic feature that, in a flexural fatigue test for evaluating the grease resistance mentioned in the item of Examples described later, de Mattia cracking times (numbers until the cracking is resulted) under the environment of 130° C. are 4,000,000 or more.

EXAMPLES

In order to demonstrate the effects of the present invention, Examples will be shown below although the present invention shall not be limited at all by those Examples. Incidentally, each of the measured values mentioned in Examples was measured by the following methods.

Melting Point:

The melting point was measured using a differential scanning calorimeter "DSC type 220" manufactured by Seiko Electronic Industry. To be more specific, a sample to be measured (5 mg) was placed on an aluminum pan and tightly sealed by pushing a cover. The sample was melted at 250° C. for two minutes in nitrogen. Then, a temperature was lowered down to 50° C. at a lowering rate of 20° C./minute, then the temperature was risen from 50° C. to 250° C. at a rate of 20° C./minute, and a thermogram curve was measured. An endothermic peak by melting was determined from the resulting thermogram curve, and was adopted as the melting point.

Reduced Viscosity (dl/g):

Fully dried polyester elastomer resin composition (0.02 g) was dissolved in 10 ml of a mixed solvent of phenol/tetrachloroethane (in a ratio of 6/4 by mass). The reduced viscosity was measured by Ubbelohde's viscometer at 30° C.

Acid Value (Eq/Ton):

A sample (0.2 g) was precisely weighed, dissolved in 20 ml of chloroform and titrated using 0.01N potassium hydroxide (ethanolic solution) to determine the acid value. Phenolphthalein was used as an indicator.

Amine Value (Eq/Ton):

A sample (3 g) was precisely weighed and dissolved in 80 ml of m-cresol to prepare a solution. This solution was titrated by a pontentiometric titration method using "AT-500N" manufactured by Kyoto Denshi Kogyo using a 0.05 mol/l methanolic solution of perchloric acid as a titrating liquid. Result of the titration was converted to mg of KOH whereupon the amine value was determined.

Relative Viscosity:

Methods for measuring the relative viscosity of a polyamide resin can be classified depending on a kind of solvent to be used for dissolution. Usually, there are three methods wherein any one of three kinds of solvents (m-cresol, 96% sulfuric acid and 90% formic acid) is used. In the present invention, the relative viscosity of the polyamide resin (C) was measured using 98% sulfuric acid solution (wherein a concentration of the polyamide resin was 1 g/dl and a temperature was 25° C.)

Materials Used in Examples are as Follows.

Thermoplastic Polyester Elastomer (A):

(Polyester Elastomer A1)

In accordance with a method mentioned in Japanese Laid-Open Patent No. 09/59491, a thermoplastic polyester elastomer wherein a ratio of (terephthalic acid)/(1,4-butanediol)/(polyoxytetramethylene glycol; PTMG having a number-average molecular weight of 1500) is 100/88/12 (in molar ratio) was prepared, and used as the polyester elastomer A1.

In this polyester elastomer A1, the melting point was 197° C., the reduced viscosity was 1.86 dl/g, and the acid value was 38 eq/t.

(Polyester Elastomer A2)

In accordance with the method mentioned in Japanese Laid-Open Patent No. 09/59491, a thermoplastic polyester elastomer wherein a ratio of (terephthalic acid)/(1,4-butanediol)/(polyoxytetramethylene glycol; PTMG having a number-average molecular weight of 2000) is 100/90/10 (in molar ratio) was prepared, and used as the polyester elastomer A2.

In this polyester elastomer A2, the melting point was 205° C., the reduced viscosity was 2.15 dl/g, and the acid value was 35 eq/t.

(Polyester Elastomer A3)

The polyester elastomer A1 was treated in vacuo at 190° C. for 20 hours to give the polyester elastomer A3.

In this polyester elastomer A3, the melting point was 201° C., the reduced viscosity was 2.86 dl/g, and the acid value was 21 eq/t.

(Polyester Elastomer A4)

Polybutylene terephthalate (PBT) having a number-average molecular weight of 30000 (100 parts by mass) and 43 parts by mass of polycarbonate-diol (consisting of 1,6-hexanediol) having a number-average molecular weight of 10000 were stirred for 1 hour at 230 to 245° C. and 130 Pa. After that, it was confirmed that the resin became transparent. The content was taken out and cooled to give the polyester elastomer A4.

In this polyester elastomer A4, the melting point was 212° C., the reduced viscosity was 1.20 dl/g, and the acid value was 44 eq/t.

Alicyclic Polycarbodiimide Compound and/or Aliphatic Polycarbodiimide Compound (B)

Alicyclic polycarbodiimide compound (B1): Carbodilite LA-1 (manufactured by Nisshinbo; carbodiimide value: 4050 eq/ton; molar ratio of isocyanate group: 15:2)

Alicyclic polycarbodiimide compound (B2): Carbodilite HMV-15CA (manufactured by Nisshinbo; carbodiimide value: 3820 eq/ton; isocyanate group has been diactivated)

Polyamide Resin (C):

Polyamide resin (C1): Polyamide 6 (relative viscosity 2.6, amine value 26 eq/ton)

Polyamide resin (C2): Polyamide MXD6 (relative viscosity 1.8, amine value 136 eq/ton)

Polyamide resin (C3): Polyamide 6/66/12 (relative viscosity 1.3, amine value 490 eq/ton)

[Other Additives]

Mold-releasing agent:

Licowax E (manufactured by Clariant) Antioxidant of aromatic amine type:

Nonflex DCD (manufactured by Ouchi Shinko Kagaku) (4,4'-bis($\alpha,\alpha$-dimethylbenzyl)diphenylamine) Antioxidant of hindered phenol type:

Irganox 1010 (manufactured by BASF) Antioxidant of hindered phenol type:

Irganox 1098 (manufactured by BASF) Antioxidant of sulfur type:

Lasumit LG (manufactured by Daiichi Kogyo Seiyaku) (dilaurylthio dipropionate)

Examples 1-8, and Comparative Examples 1-3

In accordance with compounding compositions shown in Table 1, various kinds of additives were added to 100 parts by mass of the thermoplastic polyester elastomer, and mixed by melting at 240° C. using a biaxial screw-type extruder followed by making into pellets whereupon pellets of Examples 1 to 8 and Comparative Examples 1 to 3 were prepared. Those pellets were used for conducting the following evaluations. Results are shown in Table 1.

[Test Method for Evaluating Grease Resistance]

A grease (Raremax SLF) containing a urea compound as a thickener was used and evaluation was conducted according to the following flexural fatigue test and thermal aging test.

[Flexural Fatigue Test]

Ade Mattia flexing/cracking tester BE-102 (manufactured by Tester Sangyo) was used. A predetermined test piece as shown below was subjected to a repeated flexing wherein a distance between zippers is repreatedly changed between 75 mm and 19 mm under an environment of 130° C. at a rate of 300 times per minutes. Flexural fatigue resistance was evaluated as a number of repeated flexing until the test piece was broken. The test piece used was an injection-molded product (width: 20 mm; length: 100 mm; thickness: 3.6 mm; and R of a hinge area: 2.4) prepared at a cylinder temperature of 240° C. and a mold temperature of 50° C. Incidentally, the test was conducted under a state wherein 3 g of grease was applied onto a back of the test piece for confirming the grease resistance.

[Thermal Aging Test]

An injection-molded product (width: 100 mm; length: 100 mm; and thickness: 2.0 mm) was prepared at a cylinder temperature of 240° C. and a mold temperature of 50° C. The injection-molded product was punched out in a shape of dumbbell according to JIS No. 3 in a right-angle direction to a flowing direction of the resin whereupon a test piece was prepared. Annealing was conducted for 300 hours using a hot-air drier of 140° C. under a state wherein 3 g of grease was applied to one side of the test piece. After that, a tensile elongation (elongation at break) was measured in accordance with JIS K6251:2010.

[Mold Fouling Evaluation]

Pellets were molded using an electric injection molding machine EC-100N (manufactured by Toshiba Seikeiki) under conditions wherein a cylinder temperature was 300° C., a mold temperature was 50° C., an injecting time was 8 seconds, a cooling time was 10 seconds and a mold size was in 100×100×1 mmt (material: STVAX). A judgment was done according to the following indexes.

x: Sticking to the mold was generated in case of less than 500 shots

○: No sticking to the mold was generated even in case of 500 shots or more

Hereinabove, sticking to the mold stands for such a state that, after the injection molding, the molded product stuck to the fixed side and the molded product could not be automatically taken out.

TABLE 1

| Compounding compositions <part(s) by mass> | | | Example 1 | Example 2 | Example 3 | Example 4 | Example 5 | Example 6 | Example 7 | Example 8 |
|---|---|---|---|---|---|---|---|---|---|---|
| Compounding compositions <part(s) by mass> | Ingredient A | A1 | 100 | 100 | | | 100 | 100 | 100 | |
| | | A2 | | | 100 | | | | | |
| | | A3 | | | | 100 | | | | |
| | | A4 | | | | 100 | | | | 100 |
| | Ingredient B | B1 | 1.0 | 0.8 | | 0.5 | 1.0 | 0.5 | 1.0 | 1.0 |
| | | B2 | | | 1.0 | | | | | |
| | Ingredient C | C1 (Amine Value 26 eq/ton) | | | | | | | | |
| | | C2 (Amine Value 136 eq/ton) | 3 | 5 | | 3 | 1.5 | | | |
| | | C3 Amine Value 490 eq/ton) | | | 2 | | 1.5 | 3 | 0.5 | 2 |
| | Other additives | Licowax E (Mold-releasing agent) | 0.2 | 0.2 | 0.2 | 0.2 | 0.2 | 0.2 | 0.2 | 0.2 |
| | | Nonflex DCD (Antioxidant of aromatic amine type) | 0.8 | 0.8 | 0.8 | 0.8 | 0.8 | 0.8 | 0.8 | 0.8 |
| | | Irganox1010 (Antioxidant of hindered phenol type) | 0.2 | 0.2 | 0.2 | 0.2 | 0.2 | 0.2 | 0.2 | 0.2 |
| | | Irganox1098 (Antioxidant of hindered phenol type) | 0.2 | 0.2 | 0.2 | 0.2 | 0.2 | 0.2 | 0.2 | 0.2 |
| | | Lasumit LG (Antioxidant of sulfur type) | | | | | 0.2 | | | |
| Characteristic property | | Carbodiimide Functional Group | 1.1 | 0.9 | 1.0 | 1.0 | 1.1 | 0.5 | 1.1 | 0.9 |
| | | Reduced viscosity (dl/g) | 2.40 | 2.35 | 2.48 | 2.85 | 2.42 | 2.2 | 2.35 | 1.62 |
| | | Acid value (eq/ton) | 5.5 | 8 | 7 | 9.5 | 6 | 18 | 6 | 19 |
| Property evaluation | Grease Resistance | Flexural fatigue test (×ten thousands times) | 400 | 400 | 450 | 450 | 420 | 400 | 400 | 320 |
| | | Thermal aging test (%) | 250 | 220 | 280 | 200 | 250 | 200 | 200 | 300 |
| | Mold Fouling | Continuous molding test for long-term (number of shot) | ○ (500) | ○ (500) | ○ (500) | ○ (500) | ○ (500) | ○ (500) | ○ (500) | ○ (500) |

| | | | Comparative Example 1 | Comparative Example 2 | Comparative Example 3 |
|---|---|---|---|---|---|
| Compounding compositions <part(s) by mass> | Ingredient A | A1 | 100 | 100 | 100 |
| | | A2 | | | |
| | | A3 | | | |
| | | A4 | | | |
| | Ingredient B | B1 | 1.0 | 1.2 | 0.3 |
| | | B2 | | | |
| | Ingredient C | C1 (Amine Value 26 eq/ton) | 3 | | |
| | | C2 (Amine Value 136 eq/ton) | | 3 | 3 |
| | | C3 Amine Value 490 eq/ton) | | | |
| | Other additives | Licowax E (Mold-releasing agent) | 0.2 | 0.2 | 0.2 |
| | | Nonflex DCD (Antioxidant of aromatic amine type) | 0.8 | 0.8 | 0.8 |
| | | Irganox1010 (Antioxidant of hindered phenol type) | 0.2 | 0.2 | 0.2 |
| | | Irganox1098 (Antioxidant of hindered phenol type) | 0.2 | 0.2 | 0.2 |
| | | Lasumit LG (Antioxidant of sulfur type) | | | |
| Characteristic property | | Carbodiimide Functional Group | 1.1 | 1.3 | 0.3 |
| | | Reduced viscosity (dl/g) | 2.33 | 2.51 | 1.9 |
| | | Acid value (eq/ton) | 8 | 2 | 30 |

TABLE 1-continued

| Property evaluation | Grease Resistance | Flexural fatigue test (×ten thousands times) | 350 | 450 | 200 |
| --- | --- | --- | --- | --- | --- |
| | | Thermal aging test (%) | 150 | 280 | 120 |
| | Mold Fouling | Continuous molding test for long-term (number of shot) | x (150) | x (150) | o (500) |

As will be apparent from Table 1, in all of Examples 1 to 8 which were within the coverage of the present invention, the products were excellent in both terms of the grease resistance and the mold fouling. On the contrary, in Comparative Example 1 wherein the amine value of the polyamide resin (C) was too low, the mold fouling was significantly inferior and the grease resistance was also inferior. In Comparative Example 2 wherein the acid value of the polyester resin composition was too low, the mold fouling was significantly inferior. In Comparative Example 3 wherein the acid value of the polyester resin composition was too high, the grease resistance was significantly inferior.

INDUSTRIAL APPLICABILITY

The polyester elastomer resin composition of the present invention exhibits not only excellent grease resistance under high-temperature environments but also little mold fouling upon its continued use for a long term, and thus it exhibits excellent productivity. Therefore, the polyester elastomer resin composition of the present invention can be used for preparing molded products which can be used even under severe environments exceeding 140° C. in such a field wherein high levels of flexural fatigue resistance, thermal aging resistance, oil resistance, grease resistance, etc. are demanded.

The invention claimed is:

1. A polyester elastomer resin composition comprising:
a thermoplastic polyester elastomer (A) prepared by bonding a hard segment and a soft segment, wherein the hard segment comprises a polyester constituted from an aromatic dicarboxylic acid and an aliphatic and/or alicyclic diol(s) as constituting ingredients, and wherein the soft segment is at least one member selected from a group consisting of an aliphatic polyether, an aliphatic polyester and an aliphatic polycarbonate;
an alicyclic polycarbodiimide compound and/or an aliphatic polycarbodiimide compound (B); and
a polyamide resin (C) having an amine value of 50 to 2000 eq/t
in such a ratio that (B) is in 0.1 to 5 part(s) by mass and (C) is in 0.1 to 10 part(s) by mass to 100 parts by mass of (A),
wherein the polyester elastomer resin composition has an acid value which is more than 5 eq/t and not more than 20 eq/t.

2. The polyester elastomer resin composition according to claim 1, wherein the polycarbodiimide compound (B) is compounded in such a ratio that an amount of a carbodiimide functional group thereof is 0.3 to 1.5 equivalent(s) when an amount of a terminal carboxyl group in the thermoplastic polyester elastomer (A) is taken as 1.

3. The polyester elastomer resin composition according to claim 1, wherein the polyester elastomer resin composition further contains at least one kind of antioxidant selected from a group consisting of an antioxidant of an aromatic amine type, an antioxidant of a hindered phenol type, an antioxidant of a sulfur type and an antioxidant of a phosphorus type, and wherein an amount of the above antioxidant is in a ratio of 0.01 to 3 part(s) by mass to 100 parts by mass of the thermoplastic polyester elastomer (A).

4. The polyester elastomer resin composition according to claim 1, wherein a reduced viscosity of the polyester elastomer resin composition is from 2.0 to 3.5 dl/g.

5. The polyester elastomer resin composition according to claim 1, wherein a tensile elongation is 200% or more, and wherein the tensile elongation is measured on the polyester elastomer resin composition which has been subjected to a thermal treatment at 140° C. for 300 hours in a state in which a urea compound-containing grease is applied to the polyester elastomer resin composition.

6. The polyester elastomer resin composition according to claim 1, wherein the soft segment of the thermoplastic polyester elastomer resin (A) is an aliphatic polyether.

* * * * *